July 30, 1957 D. L. MICHAEL 2,800,933
RIP GUIDE FOR PORTABLE ELECTRIC SAWS
Filed June 8, 1956
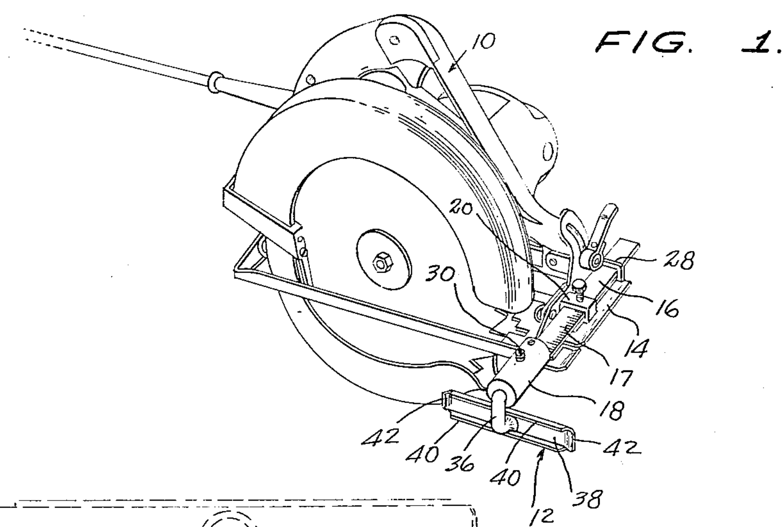
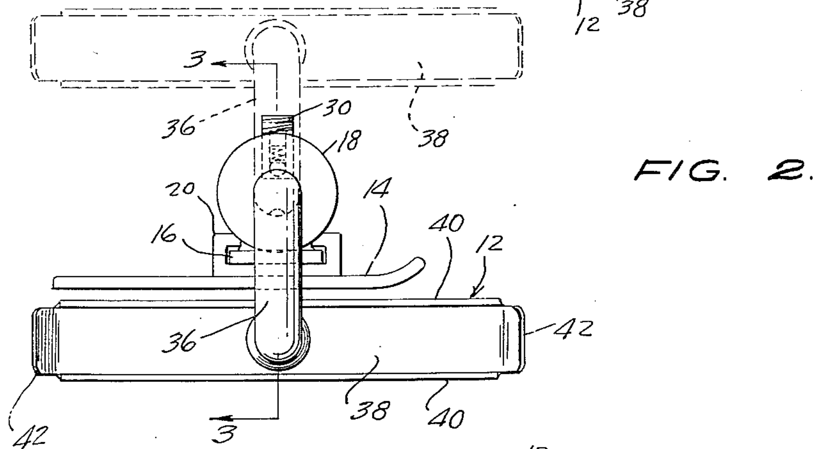
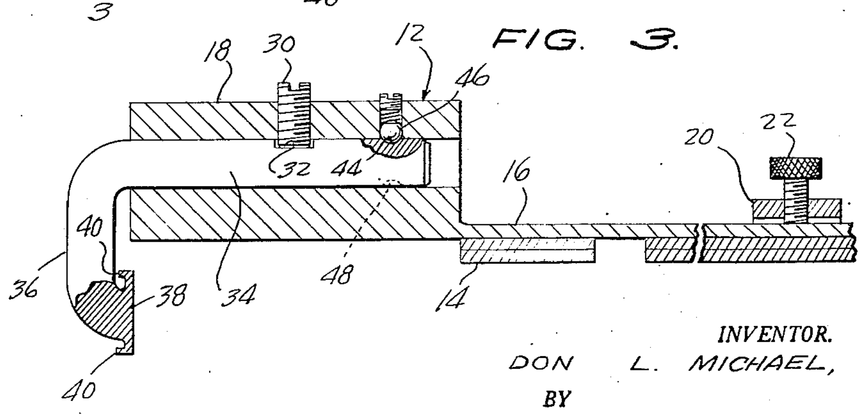
INVENTOR.
DON L. MICHAEL,
BY
McMorrow, Berman + Davidson
ATTORNEYS.

United States Patent Office 2,800,933

Patented July 30, 1957

2,800,933

RIP GUIDE FOR PORTABLE ELECTRIC SAWS

Don L. Michael, Greybull, Wyo.

Application June 8, 1956, Serial No. 590,235

1 Claim. (Cl. 143—43)

This invention relates to a rip guide for portable circular saws, so designed as to be readily adjustable to an out-of-the-way position when not needed.

In the use of a saw of the type stated, it is necessary on occasion to rip a length of stock, and on other occasions it is necessary to cross-cut the stock. Often, these two different types of sawing operations must be carried out alternately and this presents certain inconveniences so far as the rip guide of the saw is concerned.

Conventionally, a generally T-shaped rip guide is slidably mounted upon the bed plate of the saw, for movement transversely of said bed plate, the guide including a work-engaging surface depending below the plane of the bed plate. Said surface is adapted to slide along the edge of the stock that is being ripped, and under these circumstances is usable to advantage. However, if a cross cut is to be made, the guide must be removed completely, in view of the fact that the work extends into the path of movement of the guide during cross cutting. When ripping is alternated with cross-cutting, considerable inconvenience obviously exists, since the guide must be periodically removed, and then returned to position, all with considerable loss of time and much inconvenience so far as the user is concerned.

In view of the above, the main object of the present invention is to provide a rip guide for portable power saws that will be permanently mounted upon the saw, if desired, with said rip guide particularly designed to be flipped, by rotation through 180 degrees, to an out-of-the-way position whenever it is necessary to cross-cut the work, the rip guide being so designed that it may be returned to its use position with equal facility whenever needed.

Summarized briefly, the invention devised for the purpose of carrying out this broad object includes guide means fixedly secured to the bed plate in advance of the saw blade. A flat, calibrated bar is slidably mounted in said guide means for movement in a transverse direction in respect to the bed plate, and fixedly secured to one end of said bar is a sleeve in which is rotatably mounted a shaft terminating, exteriorly of the sleeve, in a radial arm carrying a guide plate. Means is provided in the sleeve adapted to limit the shaft against axial movement, and means is further provided for indexing the shaft during its rotatable movement, so that the shaft will be limited against movement beyond each position to which it is angularly adjusted.

Another object of importance is to provide a device of the nature described that will be mountable on a conventional portable power saw, without requiring modification or redesign of the saw.

Another object is to locate and form the rip guide in such a manner that it will not interfere with full visibility of the work.

Still another object is to provide a rip guide that will be swiftly adjustable to selected positions, and will be held in said positions without possibility of losing the adjustment.

A further object is to provide a rip guide that will be inexpensive, and will be trouble-free in operation.

Other objects will appear from the following description, the claim appended thereto, and from the annexed drawing, in which like reference characters designate like parts throughout the several views, and wherein:

Figure 1 is a perspective view of a portable power saw equipped with a rip guide according to the invention;

Figure 2 is an enlarged end elevational view of the rip guide as seen from the left of Figure 1, the rip guide being shown in full and dotted lines in operative and inoperative positions respectively; and Figure 3 is a longitudinal section through the rip guide on line 3—3 of Figure 2.

Designated generally at 10 is a conventional portable electric saw, while at 12 there has been similarly designated the rip guide constituting the invention.

The saw includes the usual bed or base plate 14, and in accordance with the invention there is disposed transversely of the base plate a straight, flat guide bar 16 calibrated in inches and fractions of inches as at 17.

Integral at one end with one end of the guide bar is a sleeve 18 the axis of which is parallel to and extends above the plane of the guide bar. Said plane of the guide bar is tangential to the sleeve, as shown to particular advantage in Figure 2.

Adapted to be fixedly connected to the base plate is a rectangular guide 20, within which the bar 16 is freely slidable. A threaded opening is formed in guide 20, receiving a set screw 22 that bears against bar 16 in selected positions of transverse adjustment of the bar.

Transversely spaced from the guide 20 is a second guide 28 slotted to receive the bar 16, to insure the straight line movement of the bar during use of the device.

Medially between the opposite ends of sleeve 18, there is formed therein a threaded opening, in which is engaged a screw 30 the inner end of which seats in a circumferentially extending recess 32 formed in a shaft 34, that is rotatably engaged in the bore of sleeve 18. The groove 32 extends a sufficient distance about the circumference of shaft 34 to insure that the shaft may be rotated through at least 180 degrees.

One end of shaft 34 projects beyond the outer end of sleeve 18, and is integrally formed with a radial arm 36, which terminates at its outer end in an elongated, straight guide plate 38 the plane of which is normal to the axis of rotation of shaft 34. Outwardly extending longitudinal flanges 40 are formed on the guide plate 38, and at opposite ends of said guide plate outwardly projecting lips 42 are provided, to permit the guide plate to ride over small irregularities found on the edge of the stock.

A spring-loaded ball detent 44 is mounted in the sleeve 18, at a location spaced longitudinally of the sleeve from screw 20, and is engageable in either of a pair of diametrically opposed, shallow indentations 46, 48 formed in shaft 34.

As a result, when shaft 34 is rotated, it is turnable between the full and dotted line positions of Figure 2, through 180 degrees, with the ball detent 44 engaging at opposite limits of travel of the shaft in the respective indentations 46, 48. In one position to which the shaft is rotated, guide plate 38 is disposed below the plane of the base plate 14 of the saw, so as to be located for functioning as a rip guide. In the opposite position, shown in dotted lines in Figure 2, the arm 36 and guide plate 38 project upwardly and are disposed wholly above the plane of the base plate 14. The saw under these circumstances is efficiently usable for cross-cut work, without any possibility of the rip guide interfering with the travel of the saw across the work.

This eliminates the necessity of continuously removing and reinserting the rip guide, thus providing a marked advantage over conventional rip guides heretofore employed, all of which to my knowledge required full removal whenever cross-cut work is involved.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A rip guide attachment for a portable power saw having a bed plate, comprising: a straight guide bar, said bar adapted to be disposed transversely of the bed plate; a guide adapted for fixed connection to a bed plate, said bar sliding in the direction of its length within the guide and the guide and bar being of mating noncircular cross section so as to hold the bar against rotation relative to the guide; means on the guide lockably, releasably engaging the bar in selected positions of slidable adjustment of the bar; an elongated sleeve having its length arranged as a longitudinal extension of the bar so as to be adapted to project beyond one side of the bed plate, said sleeve having its axis parallel to the length of the bar, the sleeve being fixedly connected at one end to one end of the bar; a shaft rotatably engaged in the sleeve and projecting at one end beyond the other end of the sleeve; a radial arm rigid with said one end of the shaft and terminating in a straight, elongated guide plate lying wholly in a plane normal to the axis of the sleeve and of rotation of the shaft, said plate being adjustable about said axis responsive to rotation of the shaft in the sleeve while being confined wholly in said plane during its adjustment and in each position to which it is so adjusted; and means on the sleeve releasably, lockably engaging the shaft in selected positions to which the shaft is rotated within the sleeve.

References Cited in the file of this patent

UNITED STATES PATENTS

| | | |
|---|---|---|
| 165,132 | Taylor | June 29, 1875 |
| 1,848,330 | Emmons | Mar. 8, 1932 |
| 2,671,476 | Richards et al. | Mar. 9, 1954 |